United States Patent
Giles

[11] Patent Number: 5,860,665
[45] Date of Patent: Jan. 19, 1999

[54] AIR POWERED SHOCK ABSORBER FOR FRONT AND REAR FORKS OF BICYCLES

[75] Inventor: Rivers Giles, North Hollywood, Calif.

[73] Assignee: Keith O'Neal, Chatsworth, Calif.

[21] Appl. No.: 742,416

[22] Filed: Aug. 21, 1996

Related U.S. Application Data

[60] Provisional application No. 60/002,682 Aug. 22, 1995.

[51] Int. Cl.<sup>6</sup> ........................................ F16F 5/00
[52] U.S. Cl. .................... 280/276; 280/284; 267/64.11
[58] Field of Search .................. 280/275, 276, 280/277, 283, 284, 285, 286; 267/64.11, 64.26, 64.25; 188/322.15, 322.22

[56] References Cited

U.S. PATENT DOCUMENTS

| | | | |
|---|---|---|---|
| 3,459,441 | 8/1969 | Hornsby | 280/276 |
| 3,856,287 | 12/1974 | Freitag | 267/64.11 |
| 4,153,266 | 5/1979 | Uhls | 280/276 |
| 4,524,844 | 6/1985 | Williams, Jr. | 180/219 |
| 4,971,344 | 11/1990 | Turner | 280/276 |
| 5,031,732 | 7/1991 | Batek et al. | 188/322.12 |
| 5,088,705 | 2/1992 | Tsai | 267/226 |
| 5,186,481 | 2/1993 | Turner | 280/276 |
| 5,195,766 | 3/1993 | Dohrmann et al. | 280/276 |
| 5,242,157 | 9/1993 | Bonenberger et al. | 267/64.26 |
| 5,248,131 | 9/1993 | Jobelius | 267/64.11 |
| 5,269,549 | 12/1993 | Wilson et al. | 280/276 |
| 5,275,264 | 1/1994 | Isella | 188/299 |
| 5,310,203 | 5/1994 | Chen | 280/276 |
| 5,328,196 | 7/1994 | Ohma | 280/276 |
| 5,346,236 | 9/1994 | Ohma | 280/276 |
| 5,354,085 | 10/1994 | Gally | 280/285 |
| 5,359,910 | 11/1994 | Chang et al. | 74/551.2 |
| 5,367,918 | 11/1994 | Chang et al. | 74/551.2 |
| 5,382,037 | 1/1995 | Chang et al. | 280/276 |
| 5,417,446 | 5/1995 | Pileggi | 280/276 |
| 5,628,496 | 5/1997 | Chamberlin | 267/64.11 |
| 5,628,524 | 5/1997 | Klassen et al. | 280/284 |
| 5,685,553 | 11/1997 | Wilcox et al. | 280/283 |

*Primary Examiner*—Kevin Hurley
*Attorney, Agent, or Firm*—Shlesinger, Arkwright & Garvey LLP

[57] ABSTRACT

A shock absorber for use in a bicycle, comprises a housing; a piston within the housing and a rod secured to the piston. The housing includes a first chamber disposed on one side of the piston and a second chamber disposed on an opposite side of the piston. The rod includes a rod chamber communicating with the first chamber. A one-way valve is disposed between the first chamber and the rod such that excess pressure within the first chamber is bled to the rod chamber during a downward stroke of the piston; and an orifice disposed between the rod chamber and the first chamber to allow pressure therebetween to equalize.

23 Claims, 2 Drawing Sheets

AIR POWERED SHOCK ABSORBER FOR FRONT AND REAR FORKS OF BICYCLES

RELATED APPLICATION

This application is a regular application of provisional application serial no. 60/002,682, filed Aug. 22, 1995, which is incorporated herein by reference.

FIELD OF THE INVENTION

The present invention relates to a shock absorber for use in front and rear forks of a bicycle.

OBJECTS AND SUMMARY OF THE INVENTION

It is an object of the present invention to provide a shock absorber for use in the front or rear forks of a bicycle that is tunable for the expected terrain in which it will be used.

It is another object of the present invention to provide a shock absorber for use with bicycles that is adjustable as to the amount of travel of the moving parts from minimum travel for a stiff shock to a maximum for soft operation.

It is still another object of the present invention to provide a front fork for a bicycle that is adjustable as to the rake angle and the amount of trail of the front wheel.

It is another object of the present invention to provide a shock absorber for bicycles that provides a balanced suspension for a quick and smooth response to the rider.

In summary, the present invention provides a shock absorber for use in a bicycle, comprising a cylinder; a piston disposed within said cylinder, said piston defining first and second chambers; and a third chamber communicating with said first chamber such that excess pressure generated in said first chamber during a downward stroke of said piston is transferred to said third chamber, thereby absorbing shocks encountered during use.

These and other objects of the present invention will become apparent from the following detailed description.

DETAILED DESCRIPTION OF THE INVENTION

Figure 1:
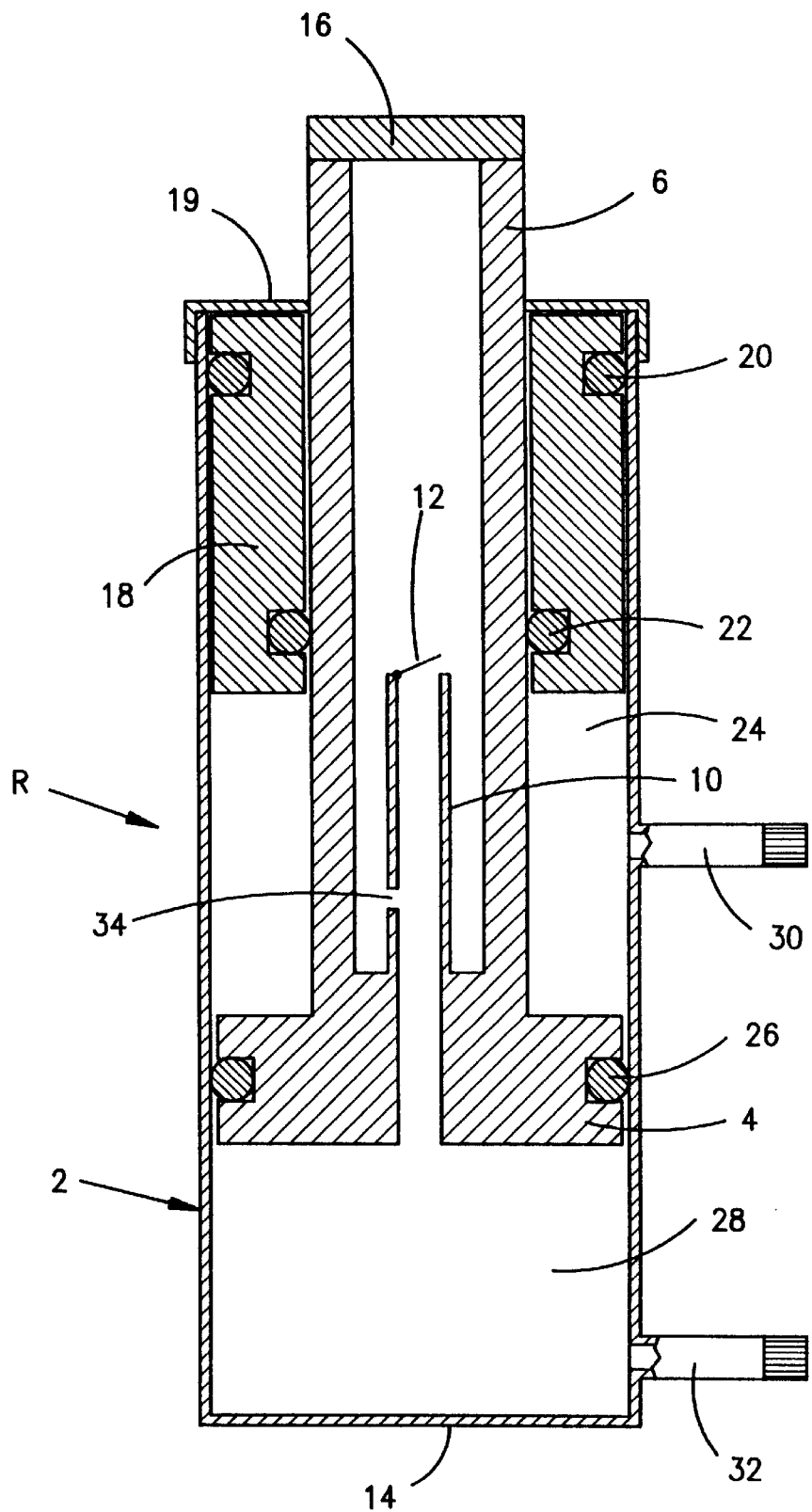
FIG. 1 is cross-sectional view of a shock absorber made in accordance with the present invention.

An air powered shock absorber R in accordance with the present invention is disclosed in FIG. 1. The shock absorber R comprises a double acting air cylinder 2 with a piston 4 connected to a piston rod 6 in the form of a hollow tube. An opening 8 through the piston 4 communicates with a pipe 10, at the other end of which is a one-way valve 12 that communicates with the interior of the hollow tube 6.

The bottom end 14 of the cylinder 2 can include standard connection means, such as a slot, for securing one end of the axle of the front wheel of the bicycle. The upper end 16 of the hollow tube can include standard means, such as a clamp arrangement, for securing to the steering rod of the bicycle. It will be understood to a person of ordinary skill in the art that a pair of shock absorbers R, one for each end of the front wheel axle, will be required for the bicycle, in the case where the shock absorber R is integrated into the two legs of the front fork. It will also be understood that only one shock absorber R would be used where it is integrated into the steering rod of the front fork.

A bushing 18 is secured inside the cylinder 2 to guide the hollow tube 6 as it moves longitudinally upwardly or downwardly during use. Seals 20 and 22, disposed between the bushing and the interior side of the cylinder 2 and the hollow tube 6, provide an air tight seal for the upper chamber 24 to prevent the compressed air from leaking to the outside. Seal 26, disposed between the piston 4 and the inner wall of the cylinder 2, seals the lower chamber 28 from the upper chamber 24. An air valve 30, such as a standard tire valve, communicates with the upper chamber 24 and provides means for introducing compressed air into the chamber. An air valve 32, such as a standard tire valve, communicates with the lower chamber 28 and permits compressed air to be introduced into the lower chamber 28. It will be understood that the volume and pressure of air in the upper chamber 24 are initially independent from the pressure and volume of air in the lower chamber 28; however, pressure equilibrium will be reached between the two chambers. A small bleed hole 34 disposed on the side of the pipe 10 allows air that has been forced into the interior of the hollow tube 6 to flow back into the chamber 28.

The chambers 24 and 28 are filled with compressed air through the respective valves 30 and 32. The piston 4 will find an equilibrium position to equalize the force acting on either side of the piston 4.

The compressed air in the chamber 28 acts as a spring. The distance between the piston 4 and the bottom end 14 of the cylinder 2 is the amount of travel available before the shock absorber bottoms out. This distance can be advantageously altered by changing the volume ratio of air in the chamber 28 compared to the volume of air in the chamber 24. Thus, the amount of travel available can be advantageously changed to zero, where the volume of air in the chamber 24 is maximum and the volume of air in the chamber 28 is essentially zero. This effectively makes the shock absorber R rigid. The ratio of the air in the chambers 24 and 28 can also be altered so that the amount of travel of the piston 4 is at a maximum, such as 10 inches. Further, the pressure in each of the chambers 24 and 28 can be advantageously changed such that at any set amount of travel for the piston 4, the shock absorber R can behave as a soft spring, where the pressure in the chambers is substantially zero, to being rigid, where the pressure is several hundred pounds to the maximum capacity of the seals 20, 22 and 26.

Increasing the travel of the piston 4 by adjusting the volume ratio of the air in the chambers 24 and 28 raises the frame of the bicycle and increases the rake angle and the amount of trail of the front wheel. Decreasing the travel likewise decreases the rake angle and trail. Increasing the rake angle and trail increases the self straightening force on the front wheel, making it more stable at high speed over rough straight sections of the path, but making it more difficult in the turns. Decreasing the rake and trail makes the wheel less stable over the straight rock sections of the trail but makes it handle better in the turns.

Thus, it would be understood that the shock absorber R is tunable to adapt the bicycle to the terrain expected to be encountered during use. The pressure, rake angle, trail and total travel can be adjusted for the best compromise in handling, depending on the conditions, such as the rider's weight, experience, style, type of race, the type of course, and the track conditions as well as the geometry of the bicycle in which the shock absorber R is installed.

In addition to the tunability of the shock absorber R, it also has full dampening characteristic to absorb the shocks encountered during use. As the shock absorber R compresses, the piston 4 traveling downwardly and compressing the air in the chamber 28, the air is forced through the opening 8 and through the one way valve 12 and into the interior of the hollow tube 6. The air is then returned back to the chamber 28 through the bleed hole 34 such that the rebound is slowed down enough to keep the wheel in contact with the ground at all times, preventing the bouncing of the wheel and the consequent jarring of the rider, while at the same time providing enough rebound so that the shock absorber R is ready for the next bump.

The shock absorber R provides a balanced suspension system, since the force on both sides of the piston 4 is balanced. This advantageously provides a quick and smooth response to the rider. The shock absorber R also provides a progressive response, providing more resistance as the piston 4 compresses the air in the chamber 28, but allowing some modulation as the compressed air escapes to the interior of the hollow tube 6 through the one-way valve 12.

Figure 2:
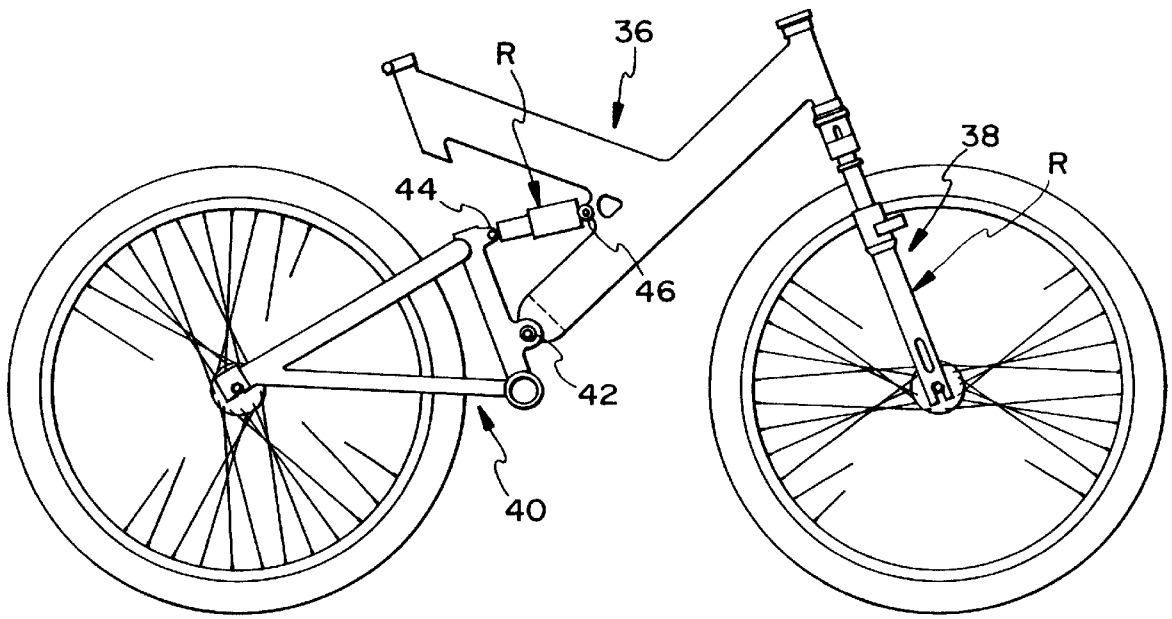
FIG. 2 is a side elevational view of a bicycle frame showing front and rear forks utilizing the shock absorber of FIG. 1

A bicycle frame 36 with a front fork 38 and a rear fork 40 is disclosed in FIG. 2. The shock absorber R is integrated into the each of the legs of the front fork 38 by providing standard attachment members at the respective ends 14 and 16.

The rear fork 40 is pivotable with the main frame at 42 and 44. The shock absorber R is pivotably connected at 44 and 46, such that pivotable movements of the rear fork 40 about pivot 42 are dampened by the shock absorber R.

Figure 3:
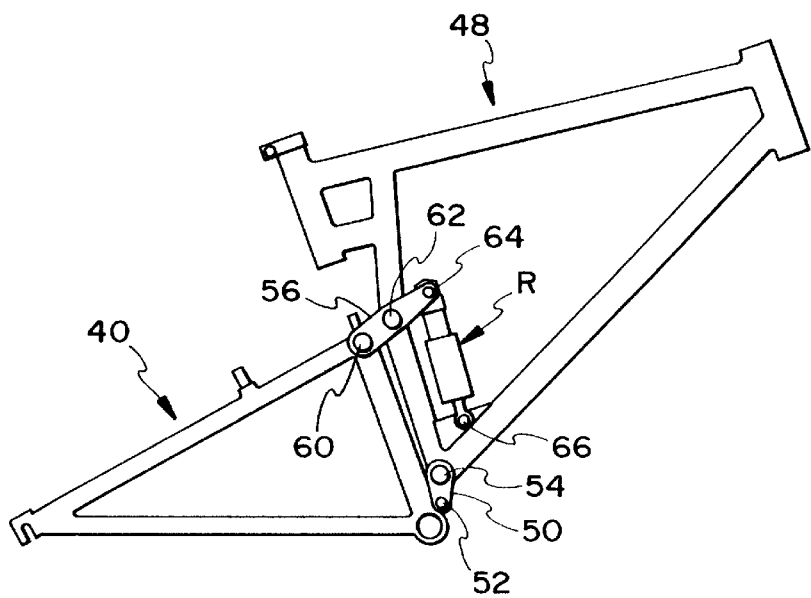
FIG. 3 is a side elevational view of a bicycle frame showing a rear fork using the shock absorber of FIG. 1.

Another bicycle frame 48 with the rear fork 40 mounted thereto is shown in FIG. 3. The lower end of the rear fork 40 is connected to the main frame by means of link 50 pivotably connected at 52 and 54. The upper end of the rear fork 40 is secured to the main frame by a member 56 pivotable at 58 and 60. The shock absorber R is pivotably connected to the member 56 at 64 and to the main frame at 66. It will be understood that pivotable and up and down motions of the rear fork 40 will be dampened by the shock absorber R.

It will be understood to the person of ordinary skill in the art that the shock absorber R as used with the front and rear forks of the bicycle will allow the user to change the geometry and, therefore, the stance of the frame with respect to the ground by varying the volume and pressure of the air within the chambers 24 and 28, so as to optimize the frame geometry to the terrain on which the bicycle will be used.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A shock absorber for use in a bicycle, comprising:
   a) a housing;
   b) a piston within said housing;
   c) a rod secured to said piston;
   d) said housing including first chamber disposed on one side of said piston and a second chamber disposed on an opposite side of said piston;
   e) said rod including a rod chamber communicating with said first chamber;
   f) a one-way valve disposed between said first chamber and said rod such that excess pressure within said first chamber is bled to said rod chamber during a downward stroke of said piston; and
   g) an orifice disposed between said rod chamber and said first chamber to allow pressure therebetween to equalize.

2. A shock absorber as in claim 1, and further comprising:
   a) a valve communicating with said second chamber for pressurizing said second chamber.

3. A shock absorber as in claim 1, and further comprising:
   a) a valve communicating with said second chamber for pressurizing said second chamber.

4. A shock absorber as in claim 1, wherein:
   a) said rod includes an attachment member for securing to a frame of the bicycle; and
   b) said housing includes an attachment member for securing to the axle of a wheel.

5. A shock absorber as in claim 1, and further comprising:
   a) a tube disposed within said rod chamber;
   b) one end of said tube communicates with said first chamber; and
   c) the other end of said tube carries said one-way valve.

6. A shock absorber as in claim 5, wherein:
   a) said orifice is disposed through said tube.

7. A shock absorber as in claim 1, wherein:
   a) said first and second chambers are pressurized.

8. A shock absorber for use in a bicycle, comprising:
   a) a housing;
   b) a piston within said housing;
   c) a rod secured to said piston;
   d) said housing including a first chamber disposed on one side of said piston and a second chamber disposed on an opposite side of said piston, said first and second chambers being pressurized; and
   e) means for absorbing increased air pressure in said first chamber during downward stroke of said piston.

9. A shock absorber for use in a bicycle, comprising:
   a) a cylinder;
   b) a piston disposed within said cylinder, said piston defining first and second chambers; and
   c) a third chamber communicating with said first chamber such that excess pressure generated in said first chamber during a downward stroke of said piston is transferred to said third chamber.

10. A shock absorber as in claim 9, and further comprising:
    a) a one-way valve disposed between said first and third chambers.

11. A shock absorber as in claim 9, and further comprising:
    a) an orifice disposed between said first and third chambers for allowing equalization of pressure between said first and third chambers.

12. A shock absorber as in claim 9, wherein:
    a) said third chamber comprises a hollow rod secured to said piston.

13. A shock absorber as in claim 12, wherein:
    a) said hollow rod includes a one-way valve communicating with said first chamber.

14. A shock absorber as in claim 13, wherein:
a) said hollow rod includes an orifice communicating with said first chamber.

15. A bicycle frame, comprising:
a) a front fork having first and second ends, said first end for being to a steering rod, said second end for being secured to a front wheel;
b) said front fork having first and second legs;
c) a shock absorber operably associated with each of said first and second legs such that shocks imparted to said legs during use are transmitted to said shock absorber;
d) said shock absorber including a piston defining first and second chambers; and
e) a third chamber communicating with said first chamber such that excess pressure generated in said first chamber during a downward stroke of said piston is transferred to said third chamber, thereby absorbing the shocks.

16. A shock absorber as in claim 15, and further comprising:
a) a one-way valve disposed between said first and third chambers.

17. A shock absorber as in claim 15, and further comprising:
a) an orifice disposed between said first and third chambers for allowing equalization of pressure between said first and third chambers.

18. A shock absorber as in claim 15, wherein:
a) said third chamber comprises a hollow rod secured to said piston.

19. A shock absorber as in claim 18, wherein:
a) said hollow rod includes a one-way valve communicating with said first chamber.

20. A shock absorber as in claim 19, wherein:
a) said hollow rod includes an orifice communicating with said first chamber.

21. A bicycle frame, comprising:
a) a rear fork having first and second ends, said first end for being secured to the frame, said second end for being secured to a rear wheel;
b) a shock absorber operably associated with said rear fork such that shocks imparted to fork during use are transmitted to said shock absorber;
c) said shock absorber including a piston defining first and second chambers; and
d) a third chamber communicating with said first chamber such that excess pressure generated in said first chamber during a downward stroke of said piston is transferred to said third chamber, thereby absorbing the shocks.

22. A bicycle frame, comprising:
a) a main frame;
b) rear fork secured to said main frame;
c) said rear fork having first, second and third ends, said first end being pivotably secured to said main frame, said second end for being secured to a rear wheel;
d) a piston/cylinder having one end operably secured to said main frame and the other end being operably associated with said third end such that lengthening or shortening of said piston/cylinder will cause said rear fork to pivot about said first end;
e) said piston/cylinder including a piston defining first and second chambers within said cylinder; and
f) first and second valves associated with said first and second chambers, respectively, such that the volume and pressure of air within said chambers may be varied to change the position of said piston within said cylinder, thereby changing the position of said rear fork relative to said main frame.

23. A bicycle frame, comprising:
a) a main frame;
b) front fork secured to said main frame;
c) a piston/cylinder operably secured to said front fork such that lengthening or shortening of said piston/cylinder will cause said front fork to increase or decrease in length, respectively;
d) said piston/cylinder including a piston defining first and second chambers within said cylinder; and
e) first and second valves associated with said first and second chambers, respectively, such that the volume and pressure of air within said chambers may be varied to change the position of said piston within said cylinder, thereby changing the length of said front fork.

* * * * *

UNITED STATES PATENT AND TRADEMARK OFFICE
CERTIFICATE OF CORRECTION

PATENT NO. : 5,860,665

DATED : January 19, 1999

INVENTOR(S) : Rivers Giles

It is certified that error appears in the above-identified patent and that said Letters Patent is hereby corrected as shown below:

Column 4, line 12, change "second" to --first--.

Column 4, line 13, change "second" to --first--.

Signed and Sealed this

Thirtieth Day of March, 1999

Attest:

Attesting Officer

Q. TODD DICKINSON

Acting Commissioner of Patents and Trademarks